US012617362B2

(12) United States Patent
Wu et al.

(10) Patent No.: US 12,617,362 B2
(45) Date of Patent: *May 5, 2026

(54) ELECTRONIC DEVICE

(71) Applicant: InnoLux Corporation, Miao-Li County (TW)

(72) Inventors: Yuan-Lin Wu, Miao-Li County (TW); Tsung-Han Tsai, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 22 days.

This patent is subject to a terminal disclaimer.

(21) Appl. No.: 18/963,415

(22) Filed: Nov. 27, 2024

(65) Prior Publication Data

US 2025/0091542 A1     Mar. 20, 2025

Related U.S. Application Data

(63) Continuation of application No. 17/697,947, filed on Mar. 18, 2022, now Pat. No. 12,187,215.

(30) Foreign Application Priority Data

Apr. 19, 2021    (CN) .......................... 202110417783.3

(51) Int. Cl.
*B60R 21/205*     (2011.01)
*B60K 35/22*     (2024.01)
(Continued)

(52) U.S. Cl.
CPC ............ *B60R 21/205* (2013.01); *B60K 35/22* (2024.01); *B60K 35/50* (2024.01); *B60K 35/60* (2024.01);
(Continued)

(58) Field of Classification Search
CPC ..... B60R 21/205; B60R 21/203; B60K 37/02; B60K 2370/782; B60K 2370/816; B60K 2370/1533; B60Y 2200/11
See application file for complete search history.

(56) References Cited

U.S. PATENT DOCUMENTS 6,300,870 B1 * 10/2001 Nelson .................. B60Q 1/544
340/471
9,056,592 B1 * 6/2015 Kline .................. B60R 21/2072
(Continued)

FOREIGN PATENT DOCUMENTS

| CN | 107878386 | * | 9/2017 | |
|---|---|---|---|---|
| EP | 2-796-964 A1 | * | 4/2014 | |
| WO | WO-2019048292 A1 | * | 3/2019 | ......... B60R 21/2165 |

OTHER PUBLICATIONS

Botek translation of CN 107878386 Sep. 2017 (Year: 2017).*
Sapountzis Stefan translation of WO 2019048292 A1 Aug. 2018 (Year: 2018).*

*Primary Examiner* — Zaihan Jiang
(74) *Attorney, Agent, or Firm* — Winston Hsu

(57) ABSTRACT

An electronic device including an electronic module, an inflator and an airbag is disclosed. The airbag is configured to be inflated by a gas produced by the inflator. The electronic module is disposed on the airbag and includes a first surface, a corner connecting with the first surface and a second surface opposite to the first surface. When the airbag is not inflated by the gas, at least a portion of the second surface is disposed between the first surface and the air bag, and the electronic module is at least partially overlapped with the airbag and not overlapped with the inflator in a top-view direction of the electronic module. When the airbag is inflated by the gas, the airbag contacts the corner of the electronic module, and the airbag at least partially (Continued)

contacts the first surface of the electronic module in the top-view direction of the electronic module.

7 Claims, 12 Drawing Sheets

(51) Int. Cl.
| | | |
|---|---|---|
| *B60K 35/50* | (2024.01) | |
| *B60K 35/60* | (2024.01) | |
| *B60R 21/203* | (2006.01) | |

(52) U.S. Cl.
CPC .......... *B60R 21/203* (2013.01); *B60K 35/223* (2024.01); *B60K 2360/782* (2024.01); *B60K 2360/816* (2024.01); *B60Y 2200/11* (2013.01)

(56) References Cited

U.S. PATENT DOCUMENTS

| | | | | |
|---|---|---|---|---|
| 10,449,821 | B2 * | 10/2019 | Liu ....................... | B60G 17/016 |
| 11,046,279 | B2 * | 6/2021 | Rupp .................. | B60R 21/2346 |
| 2003/0042715 | A1 * | 3/2003 | Keutz ................... | B60R 21/203 |
| | | | | 280/730.1 |
| 2003/0164060 | A1 * | 9/2003 | Menjak .................. | B62D 5/006 |
| | | | | 74/552 |
| 2014/0121937 | A1 * | 5/2014 | Drew ...................... | F02D 29/02 |
| | | | | 701/101 |
| 2015/0367802 | A1 * | 12/2015 | Fukawatase .......... | B60R 21/205 |
| | | | | 280/732 |
| 2017/0050602 | A1 * | 2/2017 | Vinton ................... | B60N 2/809 |
| 2021/0004054 | A1 * | 1/2021 | Chen ....................... | G06F 1/163 |
| 2022/0007538 | A1 * | 1/2022 | Mou .................. | G02B 27/0179 |
| 2022/0315090 | A1 * | 10/2022 | Kojima .................. | B60K 35/22 |

* cited by examiner

ELECTRONIC DEVICE

CROSS REFERENCE TO RELATED APPLICATIONS

This application is a continuation application of U.S. application Ser. No. 17/697,947, filed on Mar. 18, 2022. The content of the application is incorporated herein by reference.

BACKGROUND OF THE DISCLOSURE

1. Field of the Disclosure

The present disclosure relates to a display module, and more particularly to a display module installed on a device of a vehicle.

2. Description of the Prior Art

In recent years, display modules are widely applied in various electronic products, such as smart phones, tablets, notebook computers, televisions or vehicle displays. With the vigorous development of electronic products, display modules have become more and more important, so that manufacturers still keep on researching and developing for new display modules, and have higher expectations for more diversified functions of products.

SUMMARY OF THE DISCLOSURE

Some embodiments of the present disclosure provide an electronic device including an electronic module, an inflator and an airbag. The airbag is configured to be inflated by a gas produced by the inflator. The electronic module is disposed on the airbag and includes a first surface, a corner connecting with the first surface and a second surface opposite to the first surface. When the airbag is not inflated by the gas, at least a portion of the second surface is disposed between the first surface and the air bag, and the electronic module is at least partially overlapped with the airbag and not overlapped with the inflator in a top-view direction of the electronic module. When the airbag is inflated by the gas, the airbag contacts the corner of the electronic module, and the airbag at least partially contacts the first surface of the electronic module in the top-view direction of the electronic module.

Some embodiments of the present disclosure provide an electronic device including an electronic module, an inflator and an airbag. The airbag is configured to be inflated by a gas produced by the inflator. The electronic module is disposed on the airbag and includes a first surface, a corner connecting with the first surface and a second surface opposite to the first surface. When the airbag is not inflated by the gas, at least a portion of the second surface is disposed between the first surface and the air bag, and the electronic module is at least partially overlapped with the airbag and overlapped with the inflator in a top-view direction of the electronic module. When the airbag is inflated by the gas, the airbag contacts the corner of the electronic module, and the airbag at least partially contacts the first surface of the electronic module in the top-view direction of the electronic module.

These and other objectives of the present disclosure will no doubt become obvious to those of ordinary skill in the art after reading the following detailed description of the embodiment that is illustrated in the various figures and drawings.

DETAILED DESCRIPTION

Figure 1:
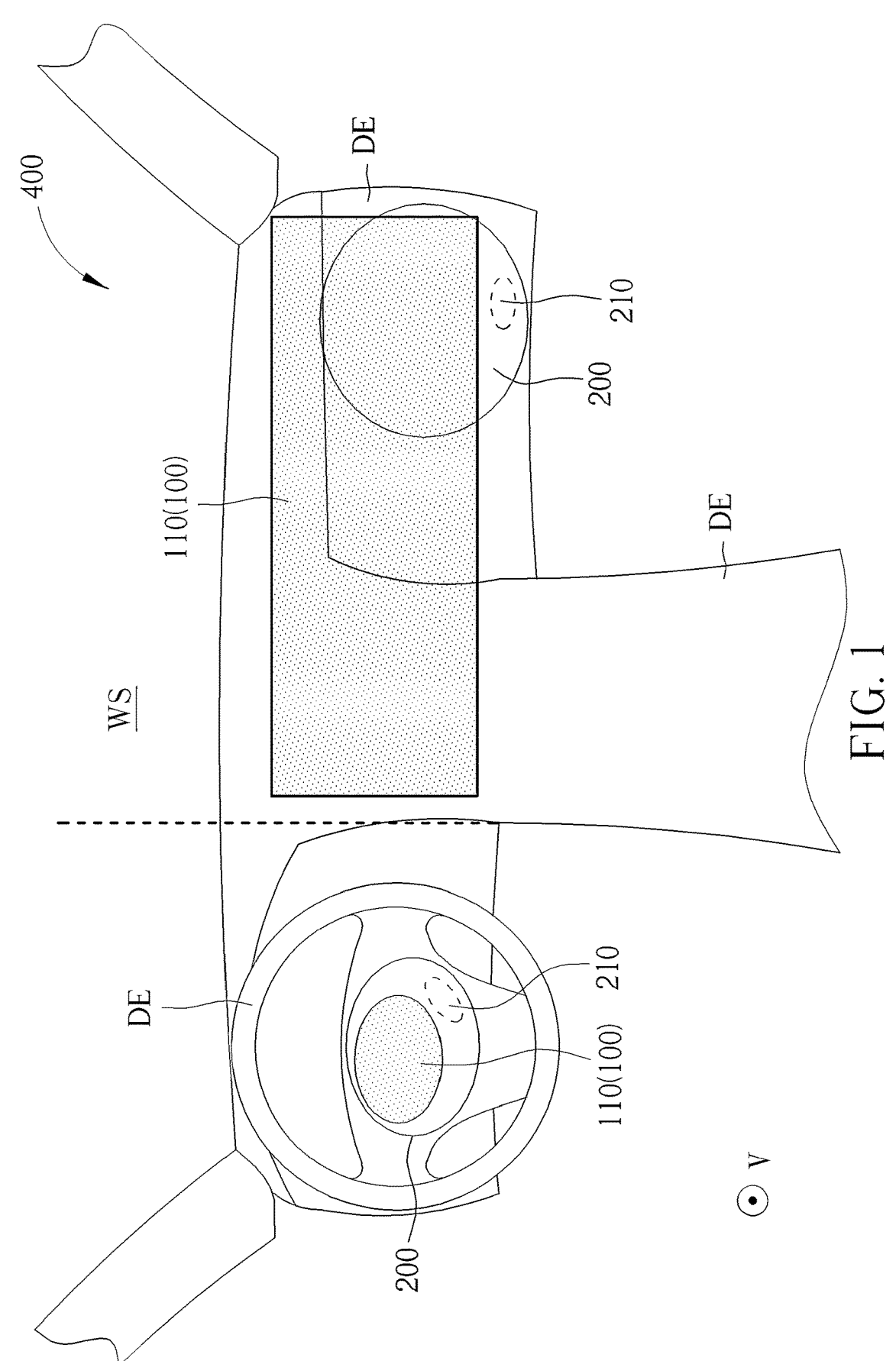
FIG. 1 is a top-view schematic diagram of display modules installed at different positions of a vehicle according to some embodiments of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the device or the structure, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". When the terms "include", "comprise" and/or "have" are used in the description of the present disclosure, the corresponding features, areas, steps, operations and/or components would be pointed to existence, but not limited to the existence or addition of one or a plurality of the corresponding or other features, areas, steps, operations and/or components.

The ordinal numbers used in the description and claims, such as "first", "second", "third", etc., are used to describe elements in the claims, but they do not mean and represent that the element(s) have any previous ordinal numbers, nor do they represent the order of one claimed element and another claimed element, or the order of manufacturing methods. The ordinal numbers are used only to clearly discriminate a claimed element with a certain name from another claimed element with the same name.

The directional terms mentioned in this document, such as "up", "down", "left", "right", "front", "back", etc., are only directions referring to the drawings. Therefore, the directional terms used are for illustration, not for limitation of the present disclosure. It should be understood that the elements specifically described or illustrated can exist in various forms known to one skilled in the art. In addition, when a component or layer is referred to as being "on" or "connected to" another component or layer, it may be directly on or directly connected to the other component or layer, or intervening components or layers may be presented (indirect condition). In contrast, when a component or layer is referred to as being "directly on" or "directly connected to" another component or layer, there are no intervening components or layers presented.

When referring to one element is disposed "on" or "above" another element, it includes the condition of direct contact, or the condition that one or plural other component(s) may be disposed between the two elements, in which there may be no direct contact between the two elements.

The terms "about", "substantially" and "approximately" mentioned in this document generally mean being within 10% of a given value or range, or being within 5%, 3%, 2%, 1% or 0.5% of a given value or range. The given quantity herein is an approximate quantity, that is, even in an absence of a specific description of "about", "substantially" or "approximately", it may still imply the meaning of "about", "substantially" or "approximately". In addition, the term "range from the first value to the second value" means that the range includes the first value, the second value and other values between them.

It should be noted that the technical features in different embodiments described in the following can be replaced, recombined, or mixed with one another to constitute another embodiment without departing from the spirit of the present disclosure.

In the present disclosure, the length and the width may be measured by an optical microscope, and the thickness may be measured by a cross-sectional image of an electron microscope, but not limited herein. In addition, some errors or inaccuracy may exist between any two values or directions used for comparison. If a first value is equal to a second value, it implies that there may be about 10% error between the first value and the second value. If a first direction is perpendicular to a second direction, the angle between the first direction and the second direction may range from 80 degrees and 100 degrees. If a first direction is parallel to a second direction, the angle between the first direction and the second direction may range from 0 degrees and 10 degrees.

Unless defined additionally, all terms (including technical and scientific terms) used herein have the same meaning as commonly understood by one skilled in the art. It can be understood that these terms, such as terms defined in commonly used dictionaries, should be interpreted as having meanings consistent with related technologies and the background or context of the present disclosure, and should not be interpreted in an idealized or excessively formal way, unless specifically defined in the embodiments of the present disclosure.

Figure 2:
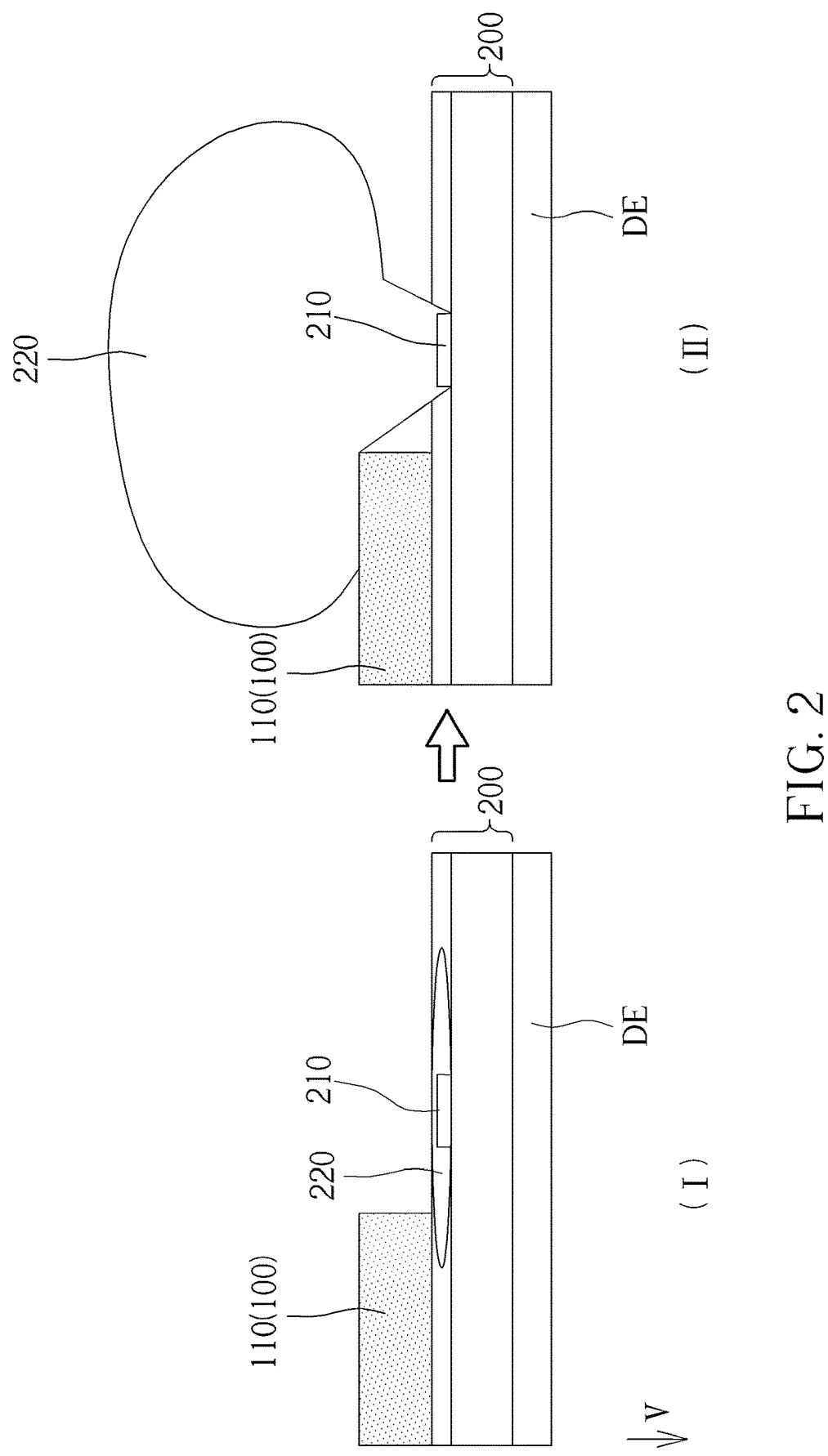
FIG. 2 is a cross-sectional view schematic diagram of a display module and an airbag module in different states according to some embodiments of the present disclosure.
Figure 3:
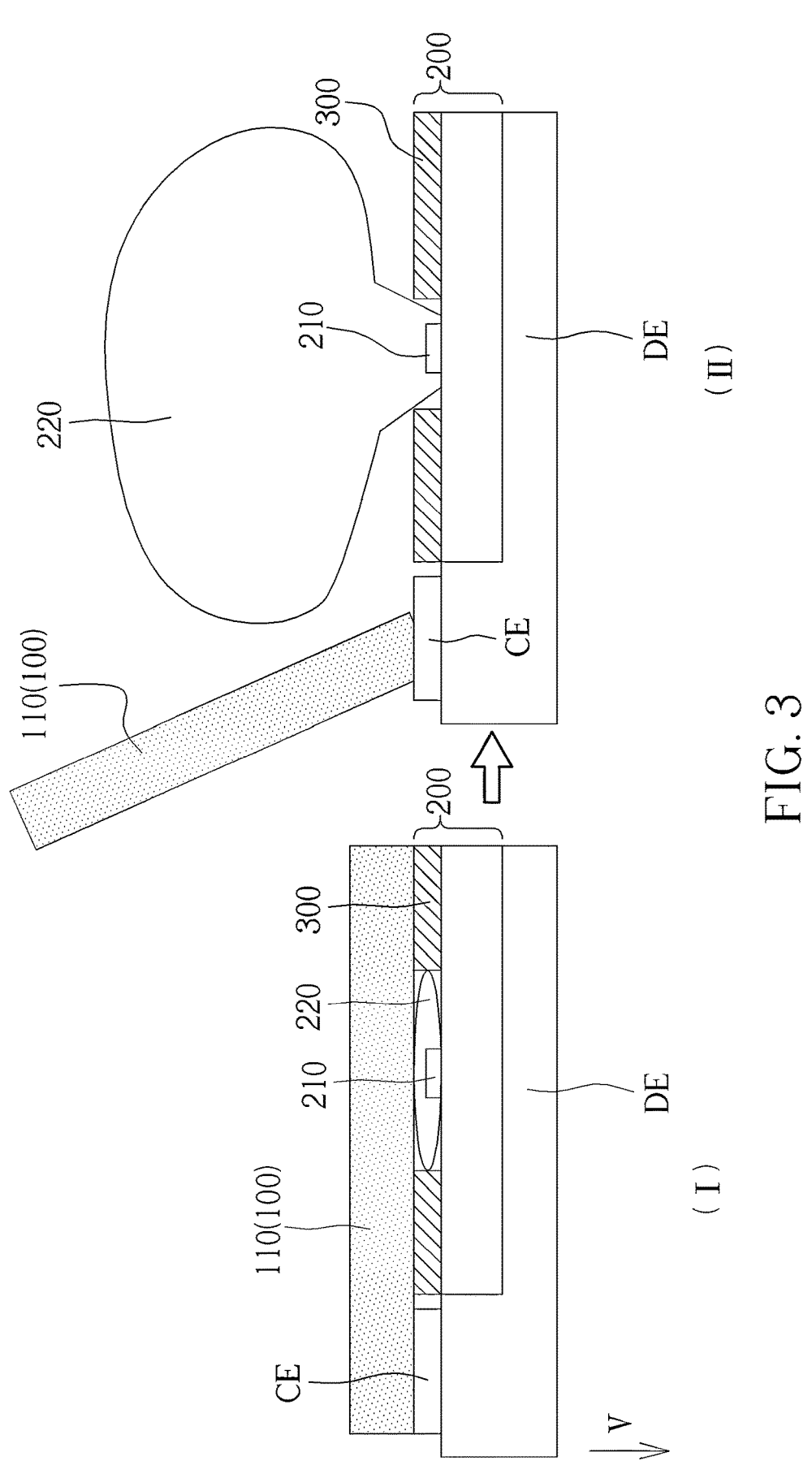
FIG. 3 is a cross-sectional view schematic diagram of a display module and an airbag module in different states according to some embodiments of the present disclosure.

Please refer to FIG. 1, FIG. 2 and FIG. 3. FIG. 1 is a top-view schematic diagram of a display modules installed at different positions of a vehicle according to some embodiments of the present disclosure. FIG. 2 is a cross-sectional view schematic diagram of a display module and an airbag module in different states according to some embodiments of the present disclosure. FIG. 3 is a cross-sectional view schematic diagram of a display module and an airbag module in different states according to some embodiments of the present disclosure. In FIG. 2, FIG. 3 and subsequent other drawings, a first state (I) illustrates the state that an airbag is not inflated by gas, and a second state (II) illustrates the state that the airbag is inflated by gas. As shown in FIG. 1, FIG. 2 and FIG. 3, a display module 100 of some embodiments of the present disclosure is installed on a device DE of a vehicle 400, and the device DE may include an airbag module 200. The airbag module 200 has an inflator 210 and an airbag 220, and the airbag 220 is configured to be inflated by the gas produced by the inflator 210. For example, the inflator 210 may include an inflation hole, and the inflator 210 may produce gas and inflate the airbag 220 through the inflation hole to make the airbag 220 expand. The airbag module 200 may optionally include a sensor and a controller, but not limited herein. In some embodiments, the device DE may be, for example, a steering wheel, a center console, a container (or a glove compartment) or any suitable device of the vehicle 400, but not limited herein. The airbag 220 may be stacked in the airbag module 200 when not inflated. When the vehicle 400 collides, in the airbag module 200, the sensor receives a collide signal first, the sensor can send a signal to the controller as long as the specified intensity is reached, and the controller can send a start signal to the inflator 210 after receiving the signal. The inflator 210 can produce a large amount of gas inside after receiving the start signal, and the produced gas enters the airbag 220 through the inflation hole, so that the airbag 220 can quickly inflate and expand in an extremely short time and leak and contract in time to absorb the impact energy. Therefore, the head and chest of the human body may be effectively protected, and the degree of injury may be mitigated.

The display module 100 includes a display panel. The display panel may be, for example, a flexible display panel, a stretchable display panel or a rollable display panel, but not limited herein. The display module of the present disclosure may include, for example, liquid crystal, light emitting diodes (LEDs), quantum dots (QDs), fluorescence or phosphors. The light emitting diodes may include, for example, organic light emitting diodes (OLEDs), mini light emitting diodes (mini LEDs), micro light emitting diodes (micro LEDs) or quantum dot light emitting diodes (e.g., QDLEDs), but not limited herein. In addition, the display module may have external systems such as such as a driving system, a control system, a light source system, a shelf system, etc. to support the display module, but the present disclosure is not limited herein. In some embodiments of the present disclosure, the display module 100 has a display function, and may optionally include sensing, touch, antenna, other suitable functions or combinations of the above functions, but not limited herein. In addition, the display module 100 may be a color display module or a monochrome display module, and the shape of the display module 100 may be rectangular, circular, polygonal, a shape with curved edges, curved or other suitable shapes, but not limited herein. In some embodiments, the display module 100 may include a tiled device, but not limited herein.

The left side of FIG. 1 shows that the display module 100 may be installed, for example, on a device DE located in front of the driver's seat, the device DE of some embodiments may be, for example, a steering wheel, and the display panel 110 may be ring-shaped, oval-shaped or circular-shaped, but not limited herein. As shown in FIG. 1, the display module 100 may be installed on, for example, the device DE in the central region in some embodiments, but not limited herein. The right side of FIG. 1 shows that the display module 100 may be installed, for example, on a device DE located in front of the passenger seat, the device DE may be a container and/or a center console below a windshield WS of the vehicle 400, and the display panel 110 may be bar-shaped or band-shaped, that is, the display panel 110 may have a long side and a short side in a top-view diagram, wherein the length of the long side is greater than the length of the short side, but not limited herein. In some embodiments, the display module 100 may be installed on the device DE in front of the passenger seat and in the central region, but not limited herein. It should be noted that the present disclosure is not limited to the designs described above, and the structures of some embodiments of the present disclosure may be respectively applied to a suitable device in front of the driver's seat or the passenger seat according to practical requirements. As shown in FIG. 2 and FIG. 3, in the first state (I), the display panel 110 is disposed on the airbag module 200 when the airbag 220 is not inflated by the gas. In the second state (II), the display panel 110 is secured to the device DE of the vehicle 400 when the airbag 220 is inflated by the gas. The term "be secured to" described above refers "at least be partially secured to", that is, at least a portion of the display panel 110 is secured to or fixed on the device DE without being separated from the device DE. That is to say, the display panel 110 and the device DE may be completely secured, wherein they do not move relative to each other (as shown in FIG. 2, but not limited herein), or the display panel 110 and the device DE may be partially secured, wherein a relative movement may occur therebetween while a portion of the display panel 110 and a portion of the device DE are not separated (as shown in FIG. 3, but not limited herein). The details of various embodiments will be described in detail below.

Please refer to FIG. 1 and FIG. 2. In some embodiments, in the first state (I), the display panel 110 is disposed on the airbag module 200 but not disposed on the inflator 210 when the airbag 220 is not inflated by the gas. That is to say, the display panel 110 is not overlapped with the inflator 210 in a top-view direction V of the display panel 110. In some embodiments, the airbag 220 may be partially overlapped with the display panel 110 in the top-view direction V. For example, the edge of the airbag 220 may be overlapped with the display panel 110. In other embodiments, the airbag 220 may not be overlapped the display panel 110 in the top-view direction V, but not limited herein. In the second state (II), the display panel 110 may still remain completely disposed on the device DE of the vehicle 400 when the airbag 220 is inflated by the gas, that is, the whole display panel 110 is completely secured to the device DE, and the display panel 110 and the device DE do not move relative to each other due to the inflation of the airbag 220. Through the design described above, the airbag 220 is not hindered when being inflated by the gas produced by the inflator 210, so the airbag 220 may be inflated normally. Furthermore, the display panel 110 may still be secured to the device DE of the vehicle 400 when the airbag 220 is inflated, so the display panel 110 does not splash, thereby improving the safety of using the display module 100. In some embodiments, in the second state (II), a portion of the airbag 220 is disposed on the display panel 110 when the airbag 220 is inflated by the gas, that is, the airbag 220 is partially overlapped with the display panel 110 in the top-view direction V of the display panel 110. Therefore, the driver or passenger in the vehicle may be protected from directly colliding with the display panel 110 after the airbag 220 is inflated, thereby mitigating the degree of injury. According to some embodiments of the present disclosure, the term "overlapped with", "partially overlapped with" or "at least partially overlapped with" refers to the status that two elements are overlapped with each other with at least a portion, that is, a portion of the first element and a portion of the second element are overlapped with each other, or in the top-view direction V, an overlapping portion exists between the projection of the first element in the top-view direction V and the projection of the second element in the top-view direction V.

Please refer to FIG. 3. In some embodiments, the display panel 110 may be secured to the device DE of the vehicle 400 (shown in FIG. 1) through a connecting element CE. The connecting element CE is used for connecting the display panel 110 with the device DE. The connecting element CE may be, for example, a hinge, a tether or any suitable connecting elements, but not limited herein. The connecting element CE may include non-metallic materials or metallic materials, but not limited herein. For example, the connecting element CE may be a hinge, thus the connecting element CE may connect the display panel 110 with the device DE, and make the display panel 110 rotate or swing relative to the device DE with the connecting element CE as the axis. As shown in FIG. 3, in the first state (I), the display panel 110 is disposed on the airbag module 200 and disposed on the inflator 210 when the airbag 220 is not inflated by the gas. That is to say, the display panel 110 is at least partially overlapped with the inflator 210 in the top-view direction V of the display panel 110. For example, the inflator 210 may be partially overlapped with the display panel 110 in the top-view direction V, or the inflator 210 may be completely overlapped with the display panel 110 in the top-view direction V. In the second state (II), when the airbag 220 is inflated by the gas to expand, a portion of the display panel 110 may be secured to the device DE of the vehicle 400 through the connecting element CE. In other words, the display panel 110 and the device DE may move relative to each other, but a portion of the display panel 110 and a portion of the device DE are still not separated from each other; alternatively, there has no substantially relative movement between the portion of the display panel 110 and the portion of the device DE. In detail, before the first state (I) is about to change to the second state (II), that is, before the airbag 220 is about to be inflated by the gas, the display panel 110 may rotate or swing relative to the device DE with the connecting element CE as the axis, so that a portion of the display panel 110 originally disposed on the inflator 210 is separated from the inflator 210 and does not cover the inflator 210. That is to say, in the top-view direction V of the display panel 110, the display panel 110 is changed from being overlapped with the inflator 210 to not being overlapped with the inflator 210. Through the design described above, the airbag 220 is not hindered or impacted by the display panel 110 when being inflated by the gas produced by the inflator 210, so the airbag 220 may be inflated normally. Furthermore, the display panel 110 may still be partially secured to the device DE of the vehicle 400 through the connecting element CE when the airbag 220 is inflated, so the display module 100 does not splash, thereby improving the safety of using the display module 100. The direction in which the display panel 110 rotates or swings relative to the device DE with the connecting element CE as the axis may be designed according to practical requirements. For example, the direction is designed as not on the path that the human body may pass when colliding with the airbag 220, so as to mitigate the injury to the driver or passenger.

In some embodiments, since the portion of the display panel 110 connected to the connecting element CE is secured to the device DE, or there is no substantial relative displacement between the display panel 110 and the device DE, the signal input end of the display panel 110 may be disposed at this portion to make the electrical connection more stable, but not limited herein. In some embodiments, as shown in FIG. 3, a cushion pad 300 may be further disposed between the display panel 110 and the airbag module 200 to reduce the impact force of the human body. The cushion pad 300 is not disposed on the inflator 210, that is, the cushion pad 300 is not overlapped with the inflator 210 in the top-view direction V of the display panel 110. In the second state (II), a portion of the airbag 220 is disposed on and/or covers the cushion pad 300 when the airbag 220 is inflated by the gas, so the human body does not directly collide with the airbag module 200, and the cushion pad 300 may further provide cushion for the human body to reduce the impact force. In some embodiments, the display panel 110 shown in FIG. 3 may be a portion of a tiled display panel, and this portion is separated from the other portions of the tiled display panel, while the other portions of the tiled display panel may be completely secured to the device DE of the vehicle 400, but not limited herein.

Figure 4:
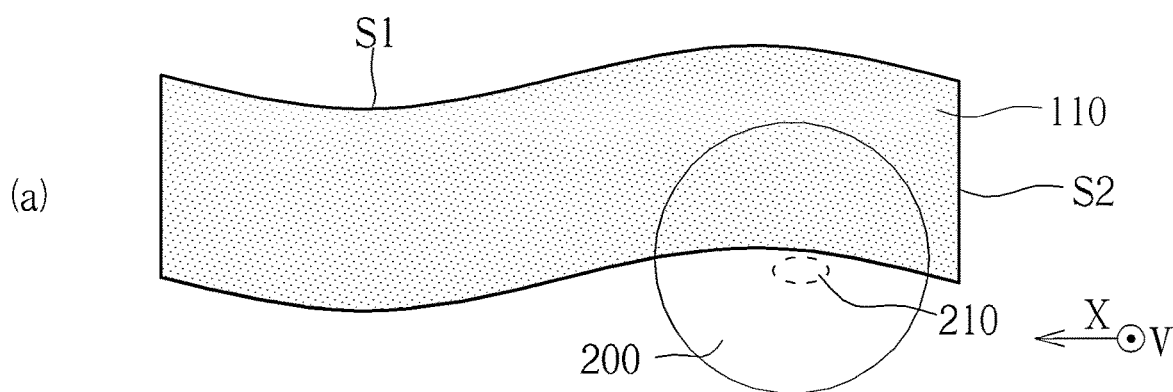
FIG. 4 is a top-view schematic diagram of a display module and an airbag module according to some embodiments of the present disclosure.
Figure 4:
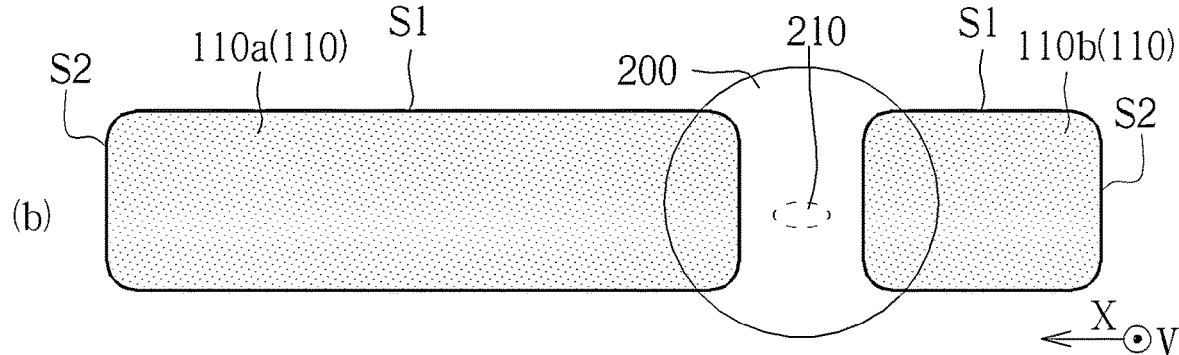
Figure 4:
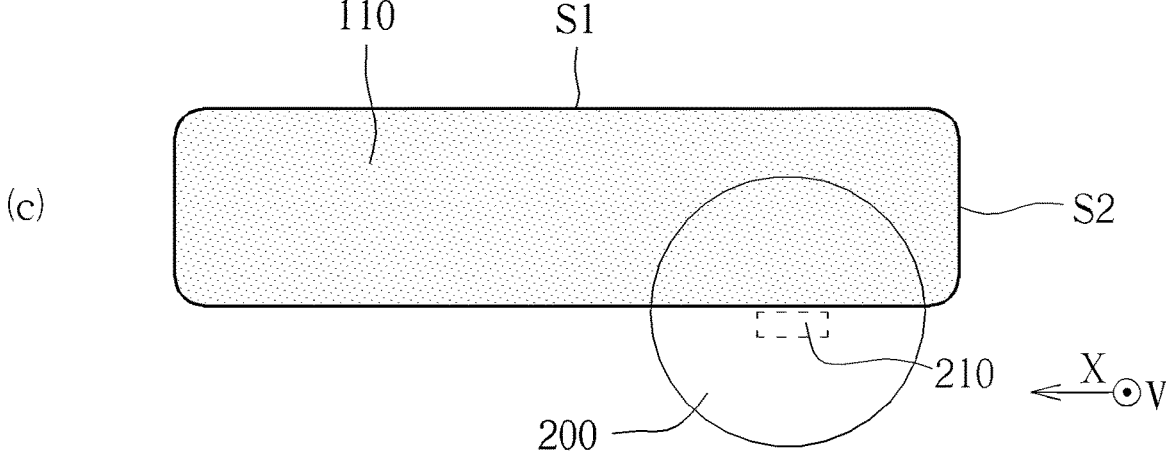

Please refer to FIG. 4. FIG. 4 is a top-view schematic diagram of a display module and an airbag module according to some embodiments of the present disclosure. As shown in an example (a), an example (b) and an example (c) of FIG. 4, the display panel 110 may be bar-shaped or band-shaped, that is, the display panel 110 may have a long side S1 and a short side S2 in a top-view diagram, wherein the length of the long side S1 is greater than the length of the short side S2. The display panel 110 substantially extends along a direction X, and the display panel 110 may not be disposed on the inflator 210. In some embodiments, the display module 100 may be installed, for example, on the device DE located in front of the passenger seat, wherein the device DE may be a container and/or a center console below the windshield WS of the vehicle 400, and the display panel 110 may be bar-shaped or band-shaped, but not limited herein. As shown in the example (a) of FIG. 4, the bar-shaped display panel 110 may be a flexible display panel, that is, the display panel 110 may be flexed along at least one direction, and the display panel 110 may be disposed on the airbag module 200, but the display panel 110 is not overlapped with the inflator 210 in the top-view direction V. As shown in the example (b) of FIG. 4, the display panel 110 may be a tiled display panel, that is, the display panel 110 may include a display panel 110a and a display panel 110b, the display panel 110a and the display panel 110b may be bar-shaped or band-shaped respectively, and neither the display panel 110a nor the display panel 110b is overlapped with the inflator 210 in the top-view direction V. For example, the inflator may be disposed between the display panel 110a and the display panel 110b in the direction X. As shown in example (c) of FIG. 4, the bar-shaped display panel 110 is not overlapped with the inflator 210 in the top-view direction V, and an edge of the inflator 210 may be aligned with one of the long sides S1 or the short sides S2 of the display panel 110. The variation embodiments described above are used for examples, and the configuration design of the display panel 110 of the present disclosure is not limited to the above configuration.

Figure 5:
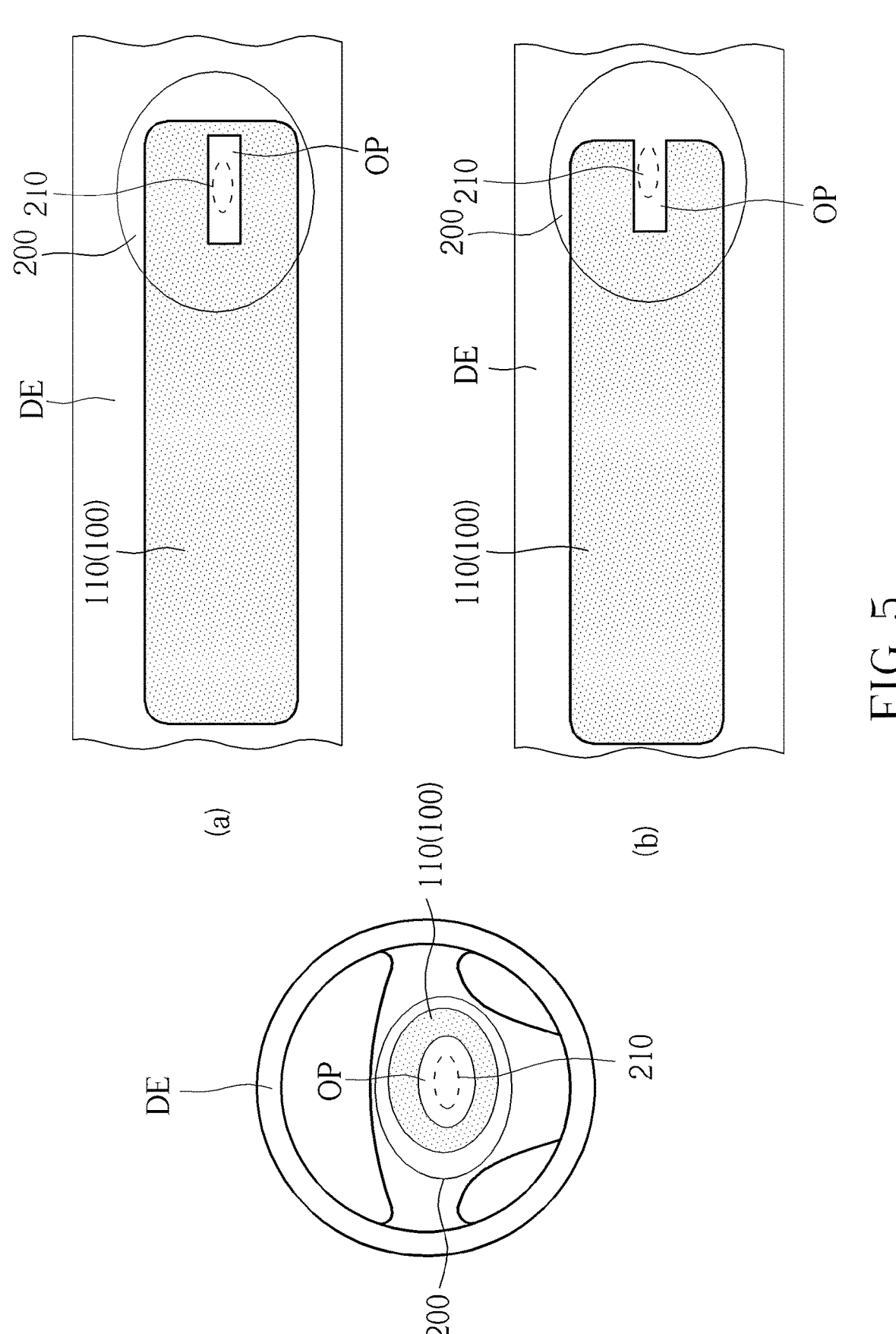
FIG. 5 is a top-view schematic diagram of display modules installed at different positions of a vehicle according to some embodiments of the present disclosure.
Figure 6:
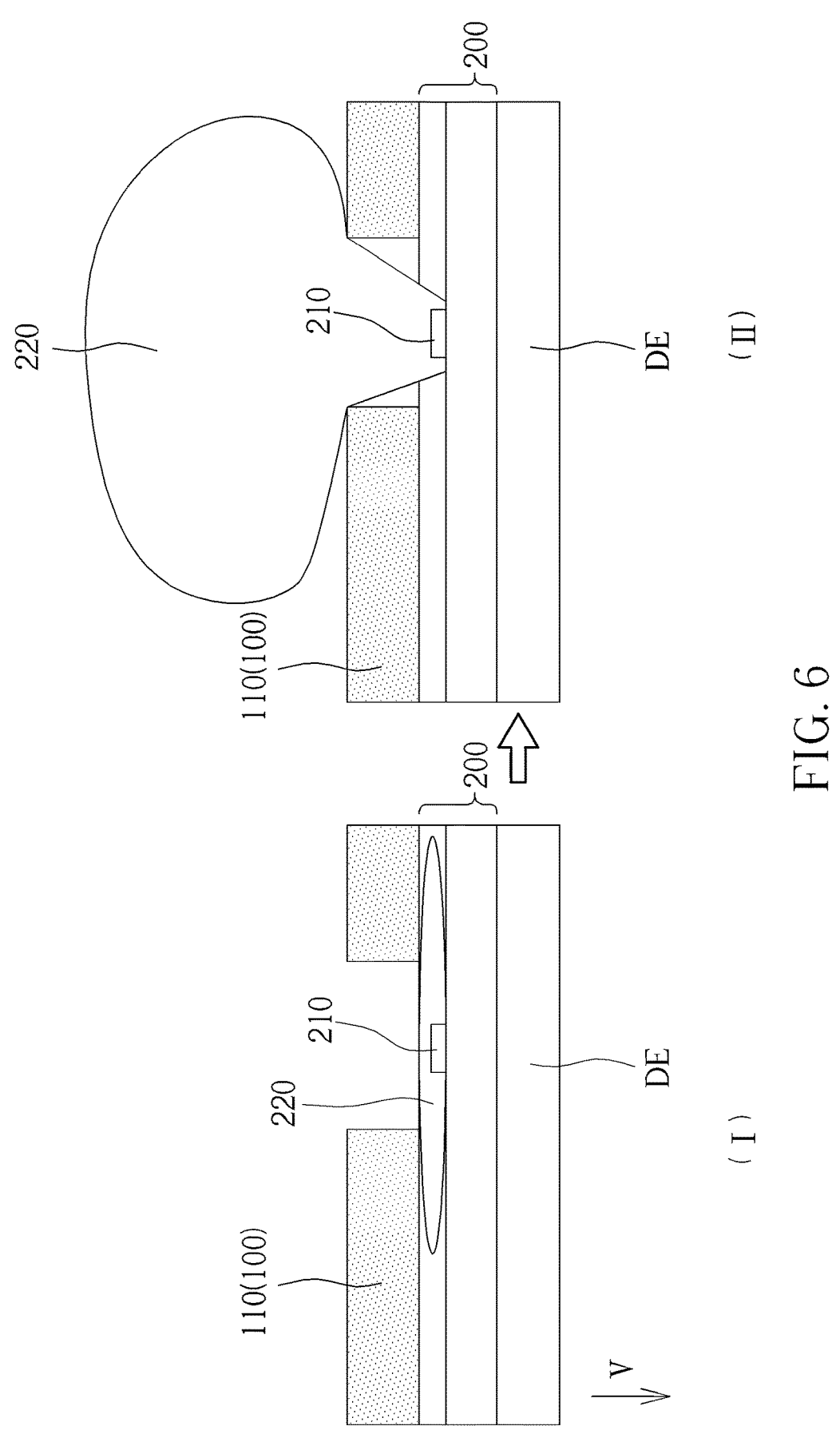
FIG. 6 is a cross-sectional view schematic diagram of a display module and an airbag module in different states according to some embodiments of the present disclosure.

Please refer to FIG. 5 and FIG. 6. FIG. 5 is a top-view schematic diagram of display modules installed at different positions of a vehicle according to some embodiments of the present disclosure. FIG. 6 is a cross-sectional view schematic diagram of a display module and an airbag module in different states according to some embodiments of the present disclosure. The left side of FIG. 5 shows that the display module 100 may be installed, for example, on a device DE located in front of the driver's seat, and the device DE may be a steering wheel. The example (a) and the example (b) on the right side of FIG. 5 respectively show that the display module 100 may be installed, for example, on a device DE located in front of the passenger seat, and the device DE may be a container (or a glove compartment) and/or a center console below the windshield WS of the vehicle 400, but not limited herein. As shown in FIG. 5 and FIG. 6, the inflator 210 is surrounded by the display panel 110 in the top-view direction V of the display panel 110. The term "surrounded" is referred to at least partially surrounded, that is, the inflator 210 may be completely surrounded by the display panel 110 in the top-view direction V, or the inflator 210 may be partially surrounded by the display panel 110 in the top-view direction V, which may be interpreted as that the inflator 210 is surrounded by a portion of the display panel 110, while the inflator 210 is not surrounded by another portion of the display panel 110, or may be interpreted that a portion of the inflator 210 is surrounded by the display panel 110, while another portion of the inflator 210 is not surrounded by the display panel 110. As shown in the left side of FIG. 5, in some embodiments, the device DE may be a steering wheel, and the display panel 110 may be annular and have an opening OP. The opening OP of the display panel 110 corresponds to the inflator 210, and the inflator 210 is completely surrounded by the display panel 110. As shown in the example (a) and the example (b) on the right side of FIG. 5, in some embodiments, the device DE may be a container (or a glove compartment) and/or a center console below the windshield, and the display panel 110 may be bar-shaped and have an opening OP. The opening OP of the display panel 110 corresponds to the inflator 210, and the inflator 210 may be completely surrounded by the display panel 110 (as shown in the example (a) on the right side of FIG. 5, but not limited herein). Alternatively, the opening OP of the display panel 110 corresponds to the inflator 210, and the inflator 210 may be partially surrounded by the display panel 110 (as shown in the example (b) on the right side of FIG. 5, but not limited herein). For example, a portion of the inflator 210 is surrounded by the display panel 110. As shown in FIG. 6, in the first state (I), when the airbag 220 is not inflated by the gas, the display panel 110 is not disposed on the inflation element 210, and the inflator 210 is surrounded by the display panel. In the second state (II), when the airbag 220 is inflated by the gas, the display panel 110 may still be secured to the device DE of the vehicle, and the display panel 110 and the device DE do not move relative to each due to the inflation of the airbag 220. Therefore, the airbag 220 may be inflated normally without causing the display module 100 to splash, thereby improving the safety of using the display module 100. A portion of the airbag 220 is disposed on the display panel 110 when the airbag 220 is inflated by the gas, so the human body does not directly collide with the display panel 110, but not limited herein.

Figures 7, 8:
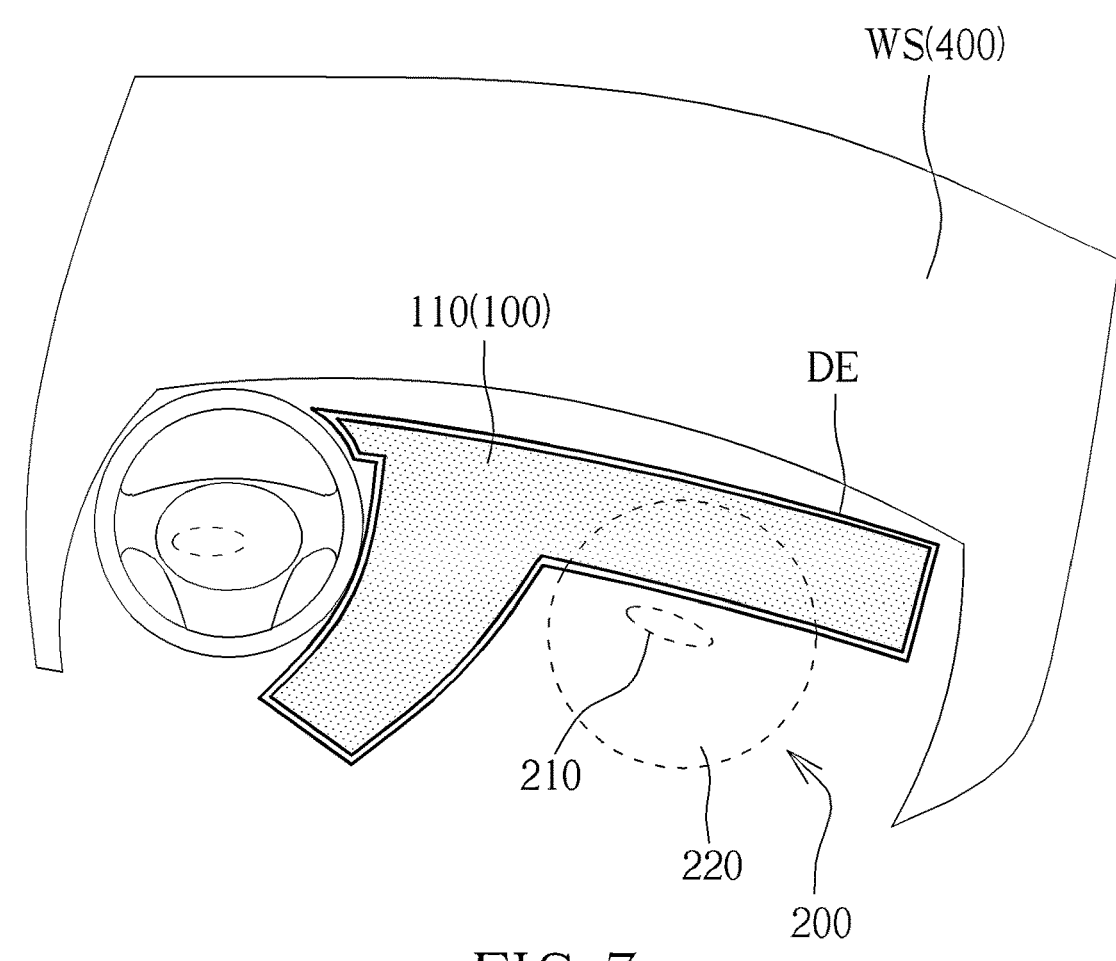
FIG. 7 is a schematic diagram of a display module installed on a device of a vehicle according to some embodiments of the present disclosure.
FIG. 8 is a partial cross-sectional view schematic diagram of a display module and an airbag module shown in FIG. 7.

Please refer to FIG. 7 and FIG. 8. FIG. 7 is a schematic diagram of a display module installed on a device of a vehicle according to some embodiments of the present disclosure. FIG. 8 is a partial cross-sectional view schematic diagram of a display module and an airbag module shown in FIG. 7. As shown in FIG. 7 and FIG. 8, the disposing of the display module 100 may not be parallel to the airbag module 200 of the device DE, or the display surface of the display panel 110 in the display module 100 may not be parallel to the surface of the airbag module 200. For example, the display panel 110 of the display module 100 may be a T-type display panel, and the display panel 110 is flatly attached to the device DE, along the surface of the device DE below the windshield WS. An included angle θ may exist between the display panel 110 and the airbag module 200, wherein the included angle θ may be, for example, the angle measured from the bottom surface of the display panel 110 to the surface of the airbag module 200, but not limited herein. When the airbag 220 is not inflated by the gas, the display panel 110 is disposed on the airbag module 200, but the display panel 110 is not disposed on the inflator 210, and the projection pattern of the display panel 110 on the surface of the airbag module 200 is not overlapped with the inflator 210. When the airbag 220 is inflated by the gas, the display panel 110 may still be secured to the device DE of the vehicle, and the display panel 110 and the device DE do not move relative to each other due to the inflation of the airbag 220. Therefore, the airbag 220 may be inflated normally without causing the display module 100 to splash, thereby improving the safety of using the display module 100.

Figure 9:
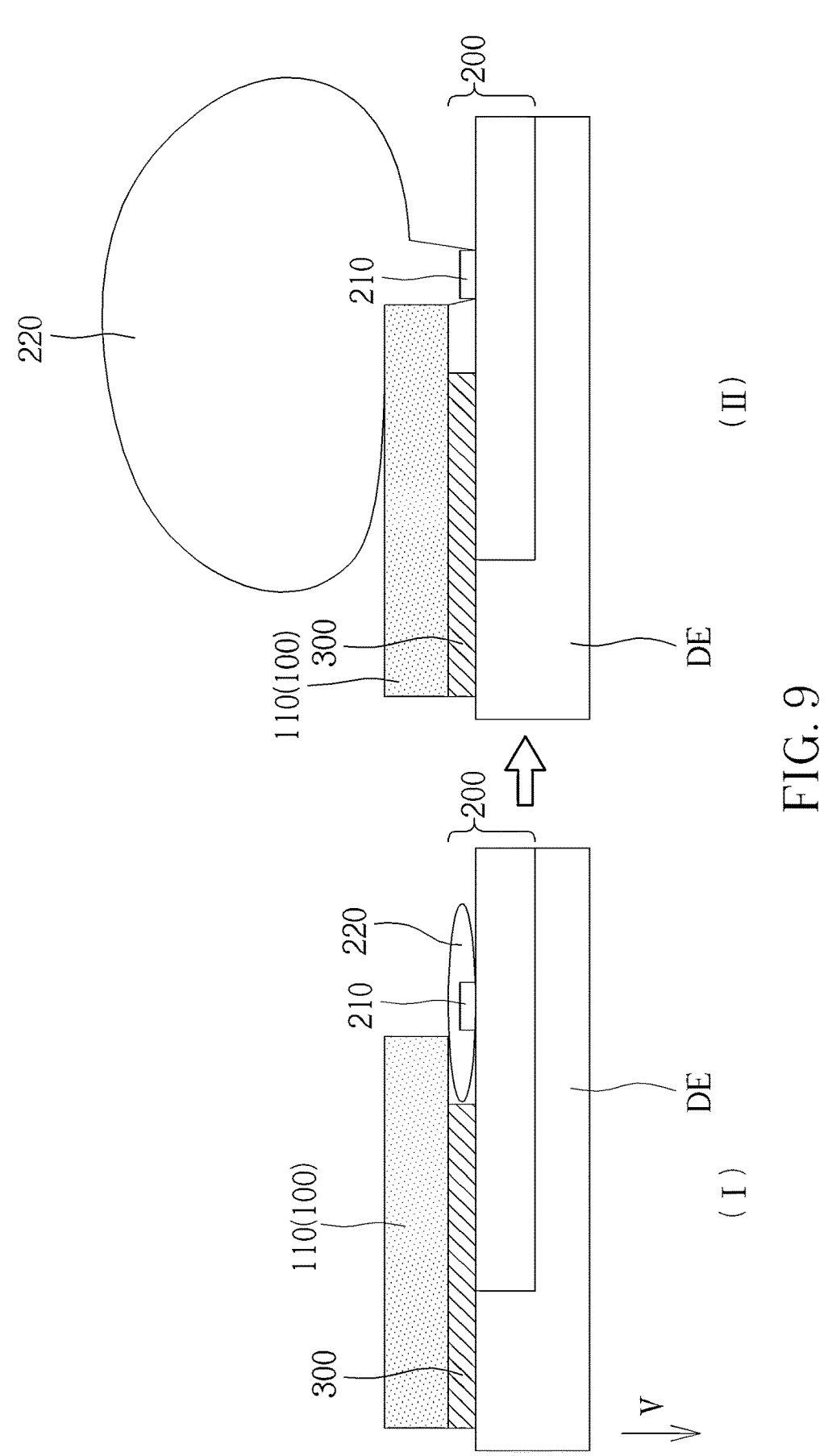
FIG. 9 is a cross-sectional view schematic diagram of a display module and an airbag module in different states according to some embodiments of the present disclosure.

Please refer to FIG. 9. FIG. 9 is a cross-sectional view schematic diagram of a display module and an airbag module in different states according to some embodiments of the present disclosure. As shown in FIG. 9, in some embodiments, a cushion pad 300 may be disposed between the display panel 110 and the airbag module 200 to reduce the impact force of the human body. In detail, in the first state (I), when the airbag 220 is not inflated by the gas, the display panel 110 is disposed on the airbag module 200, and the cushion pad 300 is disposed between the display panel 110 and the airbag module 200, but the display panel 110 and the cushion pad 300 are not disposed on the inflator 210, that is, the display panel 110 and the cushion pad 300 are not overlapped with the inflator 210. In the second state (II), when the airbag 220 is inflated by the gas, the display panel 110 may still be secured to the device DE of the vehicle, and the display panel 110 and the device DE do not move relative to each other due to the inflation of the airbag 220. In addition, a portion of the airbag 220 is disposed on the display panel 110 when the airbag 220 is inflated by the gas, so the human body does not directly collide with the display panel 110, and the cushion pad 300 may further provide cushion for the human body to reduce the impact force. In some embodiments, the cushion pad 300 and the display panel 110 may be partially disposed on the airbag module 200. For example, a portion of the cushion pad 300 is disposed on the airbag module 200 of the device DE, and this portion is located between the display panel 110 and the airbag module 200, while another portion of the cushion pad 300 is disposed on the other portions of the device DE but not located on the airbag module 200. The structure of the cushion pad 300, the display panel 110 and the airbag module 200 may be more stable through supporting the cushion pad 300 by the other portions of the device DE, wherein the size of the cushion pad 300 may be the same as or different from the size of the display panel 110.

Figure 10:
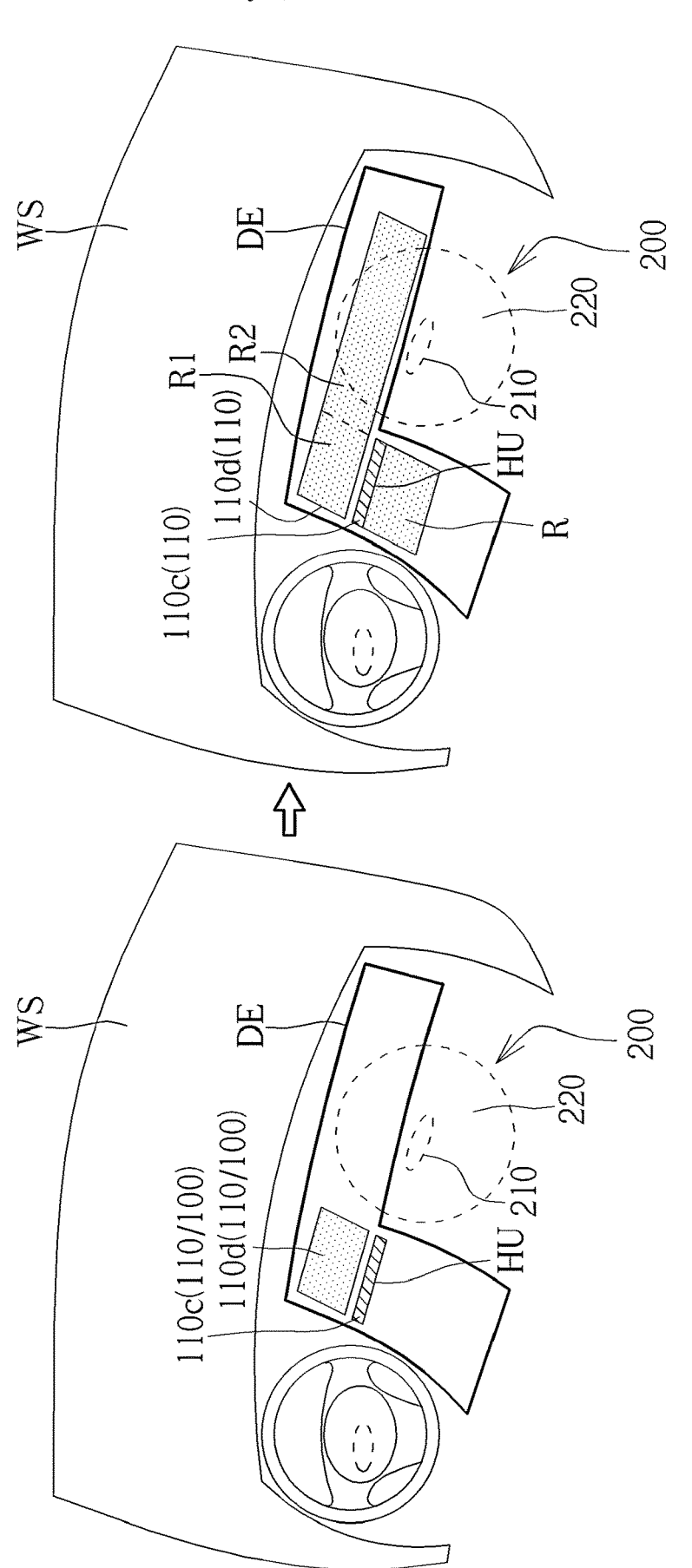
FIG. 10 is a schematic diagram of a display module installed on a device of a vehicle according to some embodiments of the present disclosure.
Figure 11:
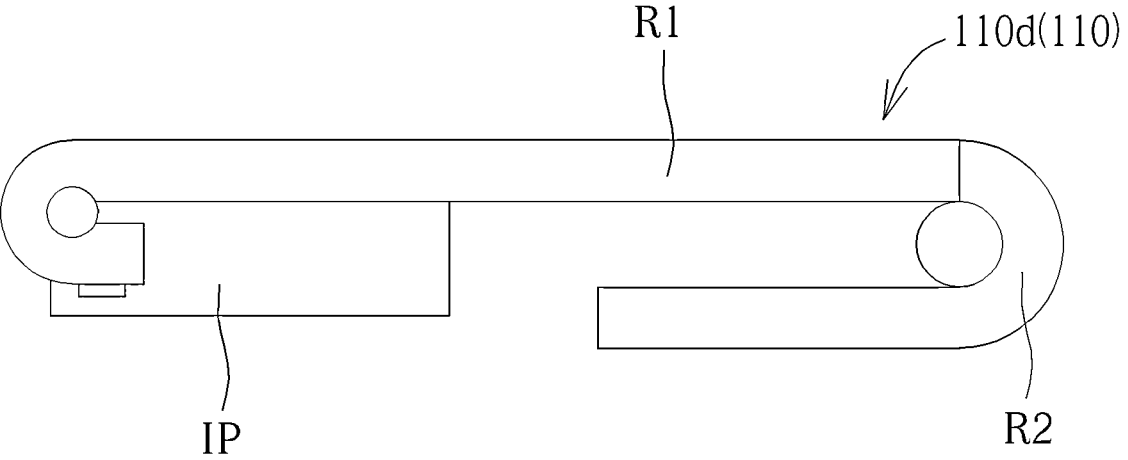
FIG. 11 is a cross-sectional view schematic diagram of a display panel shown in FIG. 10.

Please refer to FIG. 10 and FIG. 11. FIG. 10 is a schematic diagram of a display module installed on a device of a vehicle according to some embodiments of the present disclosure. FIG. 11 is a cross-sectional view schematic diagram of a display panel shown in FIG. 10. As shown in FIG. 10 and FIG. 11, the display module 100 may be installed, for example, on a device DE located in front of the passenger seat, and the device DE may be a container (or a glove compartment) and/or a center console below the windshield of the vehicle. Furthermore, the display panel 110 of the display module 100 may be a rollable display panel, and the display panel 110 may be rolled up or unfolded according to practical requirements to increase or reduce the area of the display region. When the airbag 220 is not inflated by gas, the display panel 110 is disposed on the airbag module 200, but the display panel 110 is not disposed on the inflator 210 whether it is rolled up or unfolded. That is to say, the display panel 110 is not overlapped with the inflator 210 when it is rolled up or unfolded, and the projection pattern of the display panel 110 on the surface of the airbag module 200 is not overlapped with the inflator 210. When the airbag 220 is inflated by the gas, the display panel 110 may still be secured to the device DE of the vehicle, and the display panel 110 and the device DE do not move relative to each other due to the inflation of the airbag 220. Therefore, the airbag 220 may be inflated normally without causing the display module 100 to splash, thereby improving the safety of using the display module 100. In some embodiments, the display panel 110 may be tiled by a rollable display panel 110*c* and a rollable display panel 110*d*. For example, the rollable display panel 110*c* may be received in a housing HU when it is rolled up, and the area of a display region R of the rollable display panel 110*c* may be changed by being rolled up, based on the rollable function. Furthermore, as shown in FIG. 11, the rollable display panel 110*d* may have a non-rollable region R1 and a rollable region R2. The non-rollable region R1 cannot be rolled up, and the area of the non-rollable region R1 for displaying images is fixed and constant, while the area of the rollable region R2 for displaying images can be changed by being rolled up or unfolded. In addition, the signal input end of the rollable display panel 110*d* may be connected to a side of the non-rollable region R1 through, for example, an integrated circuit chip or a circuit board IP, so as to make the electrical connection more stable. The structure of the rollable display panel described above is used for an example, and the design of the display panel 110 of the present disclosure is not limited to the above configuration.

Figure 12:
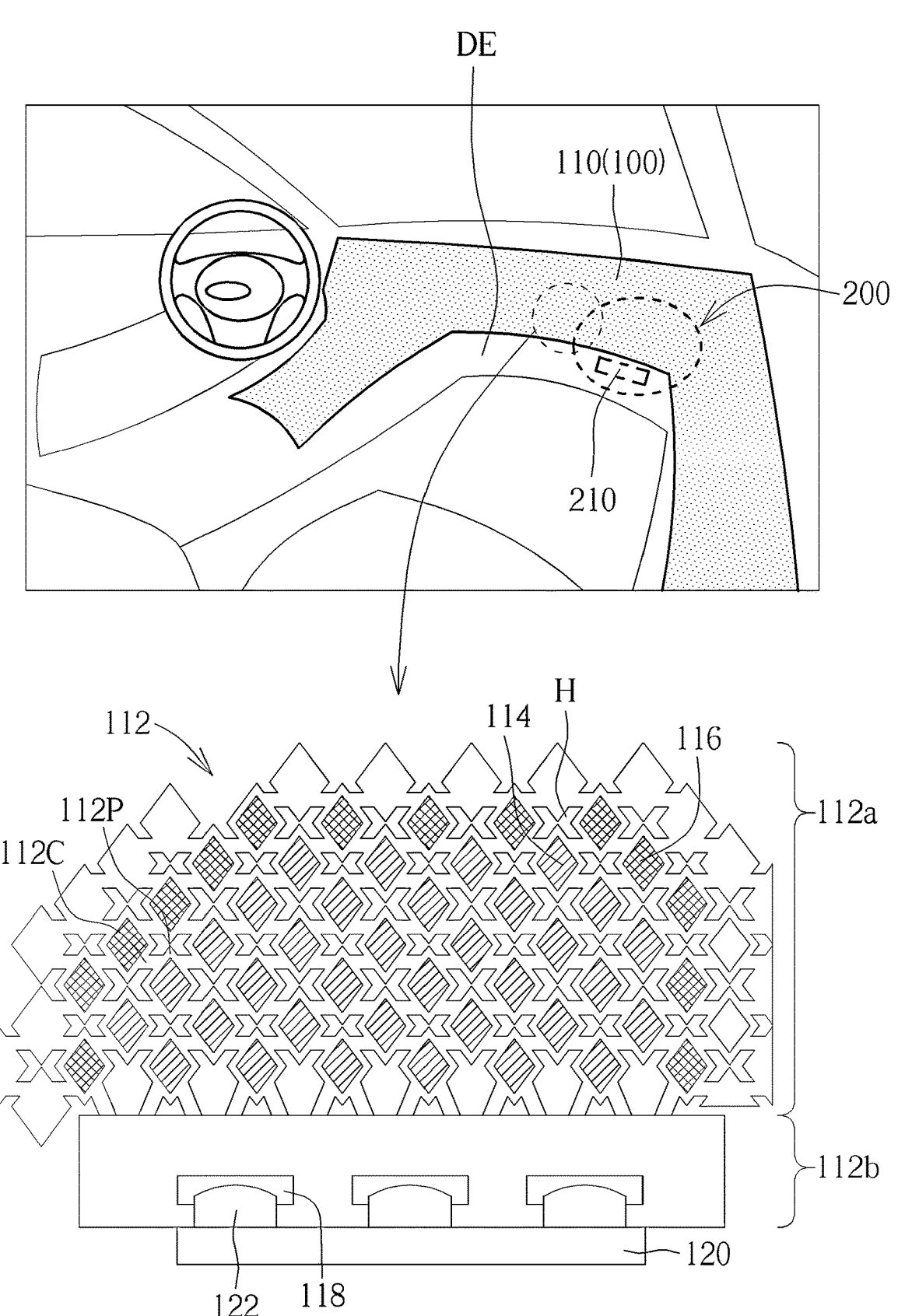
FIG. 12 is a schematic diagram of a display module installed on a device of a vehicle according to some embodiments of the present disclosure.
Figure 13:
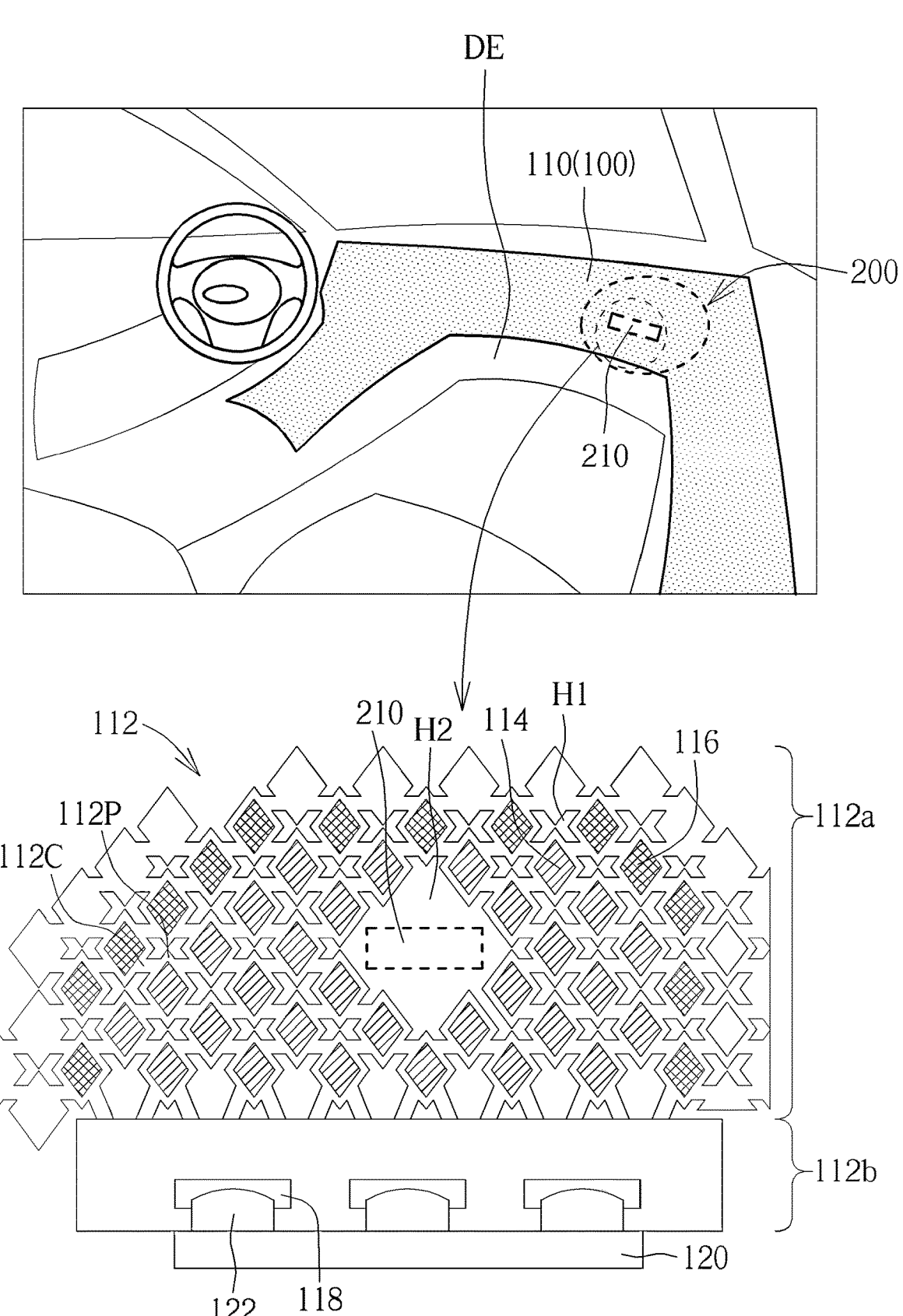
FIG. 13 is a schematic diagram of a display module installed on a device of a vehicle according to some embodiments of the present disclosure.

Please refer to FIG. 12 and FIG. 13. FIG. 12 is a schematic diagram of a display module installed on a device of a vehicle according to some embodiments of the present disclosure. FIG. 13 is a schematic diagram of a display module installed on a device of a vehicle according to some embodiments of the present disclosure. As shown in FIG. 12 and FIG. 13, the display panel 110 of the display module 100 may be a flexible display panel or a stretchable display panel, so that the display module 100 may be disposed along the surface of the device DE of the vehicle in a smoother and flatter way. The display panel 110 is not disposed on the inflator 210, that is, the display panel 110 is not overlapped with the inflator 210. In addition, a flexible cover layer may be disposed as the top layer of the flexible display panel or the stretchable display panel. Compared with the glass cover layer, the flexible cover layer may mitigate the problem of element splashing, thereby improving the safety. The flexible cover layer may include, for example, polyethylene terephthalate (PET), polyimide (PI) or other suitable materials. As shown in FIG. 12, in some embodiments, the display panel 110 of the display module 100 is a stretchable display panel, and the display panel 110 includes a stretchable substrate 112. The stretchable substrate 112 includes a patterned structure with a plurality of substrate openings H, so as to achieve the stretchable function. Through this design of the structure, the display panel 110 may be disposed along the surface of the device DE of the vehicle in a smoother and flatter way, and the impact force of the human body may be reduced. In detail, the stretchable substrate 112 includes a stretchable region 112*a* and a non-stretchable region 112*b*. The stretchable region 112*a* may include a plurality of island portions 112P and a plurality of connecting portions 112C, wherein the connecting portions 112C are connected to adjacent island portions 112P, and the substrate opening H may be formed from being surrounded by the adjacent island portions 112P and connecting portions 112C. The island portions 112P corresponding to the display region of the display panel 110 respectively have one or a plurality of sub-pixel(s) 114, one or a plurality of light emitting unit(s) 114 may be disposed on these island portions 112P, and a driving circuit 116 may be disposed on the island portions 112P corresponding to the peripheral area of the display panel 110. Peripheral circuits may be disposed in the non-stretchable region 112*b* and electrically connected to an external control element 120 through a connection pad 118 and a flexible circuit board 122. The external control element 120 may be disposed on another circuit board in other embodiments. The elements included in the display panel 110 described above may be adjusted according to practical requirements, and may be applied to other embodiments of the present disclosure. As shown in FIG. 13, in some embodiments, the display panel 110 of the display module 100 is a stretchable display panel, and the display panel 110 includes a stretchable substrate 112. The stretchable substrate 112 includes a patterned structure with a plurality of substrate openings H1 and a substrate opening H2, so as to achieve the stretchable function. The size of the substrate opening H2 is greater than the size of the substrate openings H1. Furthermore, the inflator 210 may be disposed corresponding to the substrate opening H2, that is, the substrate opening H2 exposes the inflator 210, so that the display panel 110 is not disposed on the inflator 210. In this embodiment, some island portions 112P and connecting portions 112C of the stretchable substrate 112 are disposed around the inflator 210 to form the substrate opening H2. In addition, a water and oxygen blocking design may exist around the substrate opening H2. For example, water and oxygen blocking materials may be filled around the substrate opening H2, or grooves with high and low undulations may be disposed around the substrate opening H2 to extend the invasion path of water vapor and/or oxygen. Therefore, the infiltration of water vapor and/or oxygen may be reduced. The grooves may be formed by the insulating layer in the panel manufacturing process, or may be formed by trenching the substrate, and the insulating layer may be a multi-layer structure formed by stacking organic layers and inorganic layers, but not limited herein.

From the above description, according to the display module of the embodiments of the present disclosure, the display module is disposed with accommodation to the airbag, such that the airbag can be inflated normally and smoothly without being hindered by the display panel when the airbag is inflated. Furthermore, at least a portion of the display panel is still secured to the device of the vehicle when the airbag is inflated, so the display module does not splash, thereby improving the safety of using the display module. In addition, a portion of the airbag is disposed on the display panel when the airbag is inflated by the gas, so the human body does not directly collide with the display panel, and the degree of injury may be mitigated.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising an electronic module, an inflator, and an airbag configured to be inflated by a gas produced by the inflator,
    wherein the electronic module is disposed on the airbag and comprises a first surface, a corner connecting with the first surface and a second surface opposite to the first surface, wherein when the airbag is not inflated by the gas, at least a portion of the second surface is disposed between the first surface and the air bag, and the electronic module is at least partially overlapped with the airbag and not overlapped with the inflator in a top-view direction of the electronic module,
    wherein when the airbag is inflated by the gas, the airbag contacts the corner of the electronic module, and the airbag at least partially contacts the first surface of the electronic module in the top-view direction of the electronic module.

2. The electronic device as claimed in claim 1, further comprising an accommodating space, wherein the airbag is accommodated in the accommodating space when the airbag is not inflated by the gas.

3. The electronic device as claimed in claim 1, further comprising an install portion and a connecting element disposed between the electronic module and the install portion.

4. The electronic device as claimed in claim 1, further comprising a cushion element, wherein the electronic module is disposed on the cushion element.

5. An electronic device, comprising an electronic module, an inflator, and an airbag configured to be inflated by a gas produced by the inflator,
    wherein the electronic module is disposed on the airbag and comprises a first surface, a corner connecting with the first surface and a second surface opposite to the first surface, wherein when the airbag is not inflated by the gas, at least a portion of the second surface is disposed between the first surface and the air bag, and the electronic module is at least partially overlapped with the airbag and overlapped with the inflator in a top-view direction of the electronic module,
    wherein when the airbag is inflated by the gas, the airbag contacts the corner of the electronic module, and the airbag at least partially contacts the first surface of the electronic module in the top-view direction of the electronic module.

6. The electronic device as claimed in claim 5, further comprising an install portion and a connecting element, wherein the electronic module is connected to the install portion through the connecting element.

7. The electronic device as claimed in claim 6, wherein the electronic module is capable of rotating or swinging relative to the install portion with the connecting element as an axis.

* * * * *